R. E. NOBLE.
ELECTRIC MOTOR.
APPLICATION FILED JULY 2, 1910.
1,083,260.
Patented Dec. 30, 1913.
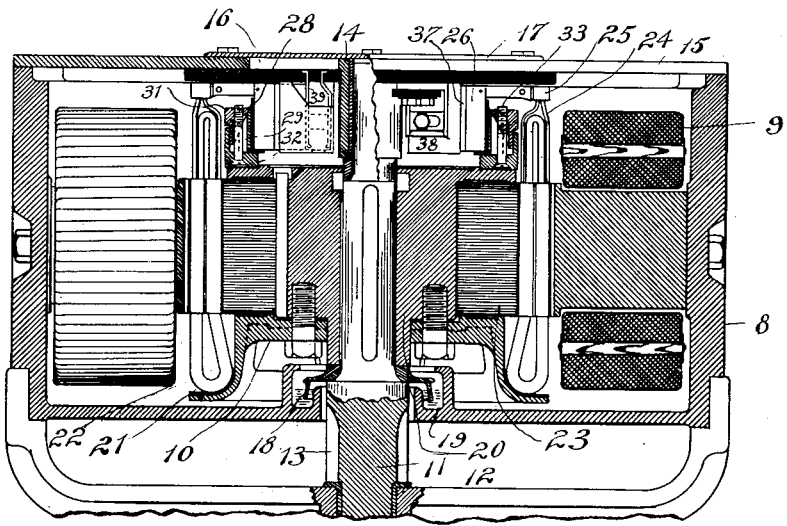
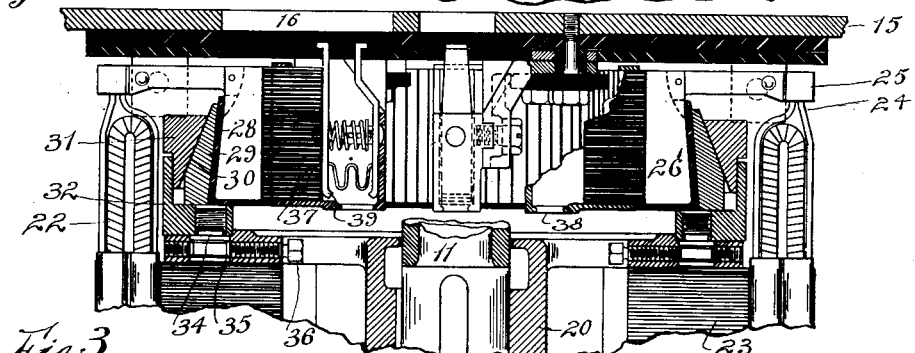
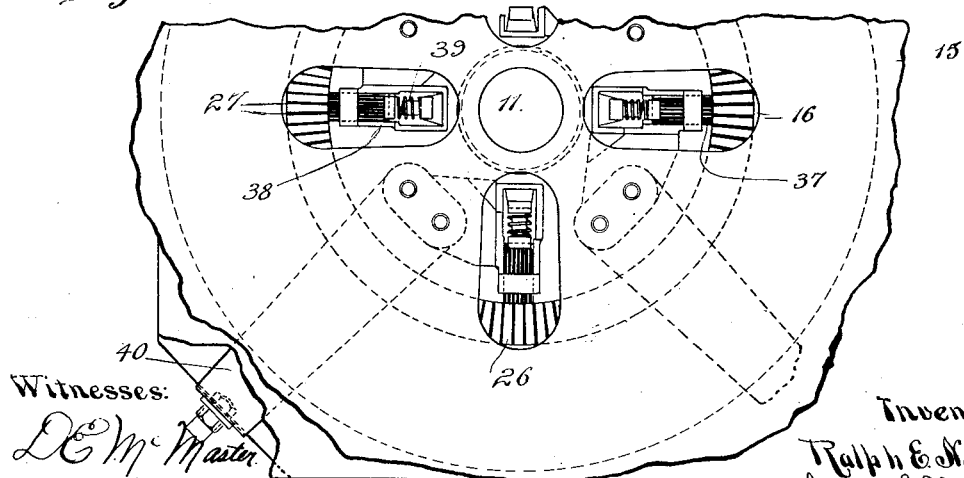
Witnesses:
D. E. McMaster
A. W. Fenstemaker
Inventor,
Ralph E. Noble,
By Glenn S. Noble
Att'y.

UNITED STATES PATENT OFFICE.

RALPH E. NOBLE, OF CHICAGO, ILLINOIS, ASSIGNOR TO MORGAN-GARDNER ELECTRIC COMPANY, OF CHICAGO, ILLINOIS.

ELECTRIC MOTOR.

1,083,260.  Specification of Letters Patent.  Patented Dec. 30, 1913.

Application filed July 2, 1910. Serial No. 570,102.

*To all whom it may concern:*

Be it known that I, RALPH E. NOBLE, a citizen of the United States, residing at Chicago, in the county of Cook and State of Illinois, have invented certain new and useful Improvements in Electric Motors, of which the following is a specification.

This invention relates in general to dynamo-electric machines, and certain features thereof may be applicable to dynamos or generators, but it is especially applicable to motors and for that reason will be described in connection with such.

In electric motors for special purposes, such for instance as in motors for electric mining machines or other similar machines, it frequently becomes highly desirable to make the motor as short as possible for a given size, that is, to make the motor of as large capacity as possible and yet have it occupy a comparatively small amount of room, particularly in some specific direction. For instance, in electric coal mining machines which are adapted to be used where the veins are narrow and there is comparatively little head room, I have found it desirable to provide a vertical motor, and one of the particular objects of the present invention is to construct said motor in such a manner that it will require as little vertical space as possible for any given capacity.

Other objects of the present invention are to simplify and strengthen the construction of such motors, to provide ample bearings for the main shaft, to make the motor as nearly air, dust and fire proof as possible, and, in general, to improve such motors in the way hereinafter pointed out and described.

I have illustrated my invention in the accompanying drawings, in which—

Figure 1 is a vertical sectional view of a motor embodying this invention, parts being broken away or shown in section for convenience in illustration; Fig. 2 is a similar detail view showing more particularly the commutator and brush arrangement; Fig. 3 is a partial plan view.

As indicated in these drawings, 8 represents the motor casing which is preferably of the inclosed type and is provided with field coils 9 and armature 10, the latter being mounted on the armature shaft 11. The armature shaft may be supported in different ways, but, as illustrated in these drawings, the lower end of the shaft engages with an out bearing 12, this end of the shaft being provided with an integrally formed pinion 13 for driving the operative parts of the machine, which, however, are not shown. The upper end of the shaft engages with an inwardly projecting bearing 14 formed integrally with, or secured to, the top plate or cover 15 of the casing 8. On account of the peculiar construction of the commutator, which will presently be described, this bearing may be extended inwardly for a considerable distance so as to give a long substantial support for the armature shaft, without increasing the height of the motor. The plate or cover 15 is provided with hand holes 16, these holes being preferably closed by means of a light cover 17, as indicated. In order to make the lower end of the motor body substantially air and dust proof, and to prevent any liability of gases which may have been ignited in the motor casing from communicating with the gases outside of the motor, the lower end of the shaft 11 is provided with a downwardly depending cup-shaped flange 18 which fits into the oil well 19 in the casing 8, thereby making an oil seal which effectually closes the pening through the lower portion of the casing, which is provided for the shaft. The spider 20 on the armature 10 is provided with a downwardly and outwardly extending flanged ring 21 which supports and protects the lower ends of the armature coils 22. These coils are wound around the portions of the laminated core 23 in any desired manner, but instead of bringing the upwardly extending turns and leads in toward the shaft, I arrange such turns around the outer periphery of the armature and thereby leave the central space adjacent to the shaft free for inserting my novel form of commutator and brush arrangement. Although such brushes are fully shown herein, they form no part of the present invention, but are reserved for incorporation in another application and the commutator forms the subject matter of a divisional application filed by me August 14, 1911, Serial No. 634,834.

The leads 24 of the armature coils are extended substantially directly upward around the outer periphery of the armature and connected, as by means of soldering or otherwise, with the commutator radials 25.

These radials connect with the commutator segments 26. These segments are preferably made in the form of short rectangular pieces, as indicated in Fig. 1, and are separated by means of insulation 27. They are also surrounded by an insulating ring of insulating material 28. The insulating ring 28 is engaged by a sectional ring 29, the sections of which are preferably beveled at the ends, so that when the ring is tightened the sections will slip somewhat upon each other in order to clamp closely against the insulating ring 28. The outer face of the sectional ring 29 is beveled as indicated at 30 and is engaged by an oppositely beveled ring 31, these two rings fitting within a flanged ring or support 32. Screws 33, passing through the support 32, engage with the ring 31 which is provided with threaded holes to receive the same, the arrangement being such that when said screws are tightened, the ring 31 will press against the beveled faces of the sections of the ring 29 and will press the sections together so as to clamp the insulating ring 28 closely against the commutator segments 26 and intermediate insulating members 27, thereby forming a simple and effective means for securely holding the commutator parts securely in position. It will also be noted that, while the screws 33 form a simple and convenient arrangement for drawing the clamping rings together, other equivalent means may also be used as come within the scope of this invention.

The flanged ring or support 32 is provided with studs 34 having grooved heads fitting within holes 35 in the upper end of the spider 20, the spider being provided with set-screws 36 adapted to engage with such heads in order to hold the supporting member and other commutator parts securely in position with respect to the armature. As shown in Fig. 2, the commutator segments 26' are slightly beveled on their outer edges, so as to further insure their being rigidly held in position by the clamping rings, although ordinarily I consider the rectangular shape preferable on account of being able to make segments by cutting off pieces of stock otherwise suitably shaped to form such segments. It will be noted that this form of commutator construction leaves a free circular opening surrounded by the commutator segments, within which opening the brushes may be located in order to make an internal contact with the commutator instead of an external contact as has heretofore been the usual practice. The brushes 37, which are preferably some form of carbon brushes, are mounted in brush holders 38 depending from the cover or top 15 of the casing. These brushes are held in contact with the commutator by means of resilient pressure devices 39, the arrangement preferably being such that the pressure devices and brushes may be removed through the openings 16 in order to renew the brushes. The brush holders are preferably insulated from the cover plate 15 and the current carried thereto or therefrom by means of brush holder leads 40. On account of the novel form of construction of my improved commutator, it will be noted that not only may the commutator segment be made very cheaply, but the entire commutator may be readily and easily assembled and then placed in position and connected with the armature, leaving the central space adjacent to the end of the spider, which is ordinarily occupied by the turns of the armature coils and the connections between the coils and the armature segments, for the insertion of the brushes. This enables the motor to be made much shorter than with the construction heretofore commonly used.

Having thus described my invention, which I do not wish to limit to the precise arrangement of parts or details of construction herein shown and described, except as set forth in the following claims, what I claim and desire to secure by Letters Patent is:

1. In a motor or the like, the combination of a barrel wound armature, with a commutator extending wholly within the end turns of the armature winding.

2. In a motor, the combination with a barrel wound armature, of a commutator with interior bearing surface extending within the end turns of the armature winding.

3. In a vertical motor, the combination of a casing, field coils arranged within said casing, an armature shaft mounted in said casing, a barrel wound armature on said shaft, a commutator made in the form of an annular ring with interior bearing surface extending within the end turns of the armature winding, connections between the outer wall of said ring and the spider of the armature for holding said commutator in position, a brush supporting member at the top of said casing, and brushes extending inwardly from said member, adapted to make contact with the inner surface of said commutator.

RALPH E. NOBLE.

Witnesses:
E. K. BOWERS,
ROBT. WISEMAN.